US012657055B2

(12) United States Patent
Patodia et al.

(10) Patent No.: US 12,657,055 B2
(45) Date of Patent: Jun. 16, 2026

(54) REDUCING PROCESSING BANDWIDTH OF NETWORKED SERVICES BY CONSOLIDATING SERVICE TASKS

(71) Applicant: PayPal, Inc., San Jose, CA (US)

(72) Inventors: Prabin Patodia, Bangalore (IN); Rajendra Bhat, Bangalore (IN)

(73) Assignee: PayPal, Inc., San Jose, CA (US)

( * ) Notice: Subject to any disclaimer, the term of this patent is extended or adjusted under 35 U.S.C. 154(b) by 544 days.

(21) Appl. No.: 18/180,012

(22) Filed: Mar. 7, 2023

(65) Prior Publication Data

US 2024/0303109 A1 Sep. 12, 2024

(51) Int. Cl.
*G06F 9/48* (2006.01)
*H04L 67/60* (2022.01)

(52) U.S. Cl.
CPC ............ *G06F 9/4881* (2013.01); *H04L 67/60* (2022.05)

(58) Field of Classification Search
None
See application file for complete search history.

(56) References Cited

U.S. PATENT DOCUMENTS

| | | | |
|---|---|---|---|
| 9,385,866 B2 | 7/2016 | Stella et al. | |
| 9,928,517 B1* | 3/2018 | Hitchcock | H04L 41/14 |
| 10,782,953 B2 | 9/2020 | De Capoa et al. | |
| 10,938,691 B1* | 3/2021 | Bonas | H04L 41/22 |
| 10,944,654 B2 | 3/2021 | Rimar et al. | |
| 2011/0171938 A1* | 7/2011 | Daugherty | H04L 41/5051 |
| | | | 455/414.1 |

| | | | |
|---|---|---|---|
| 2016/0330277 A1 | 11/2016 | Jain et al. | |
| 2017/0126820 A1* | 5/2017 | McClain | H04L 67/34 |
| 2018/0131583 A1* | 5/2018 | Barrows | H04L 67/306 |
| 2018/0131764 A1 | 5/2018 | Suter et al. | |
| 2018/0329981 A1* | 11/2018 | Gupte | H04L 41/5058 |
| 2018/0337772 A1* | 11/2018 | Acar | H04L 9/083 |
| 2019/0042276 A1* | 2/2019 | Zhu | H04L 67/60 |

(Continued)

FOREIGN PATENT DOCUMENTS

| | | | | | |
|---|---|---|---|---|---|
| CN | 111984272 | * | 11/2020 | ........ | H04L 61/5007 |
| WO | WO-2005106666 A1 | * | 11/2005 | ............... | G06F 8/61 |

OTHER PUBLICATIONS

International Search Report and Written Opinion for Application No. PCT/US2024/016804, mailed on May 3, 2024, 21 pages.

*Primary Examiner* — Charles E Anya
(74) *Attorney, Agent, or Firm* — Kowert, Hood, Munyon, Rankin & Goetzel, P.C.; Scott W. Pape; Dean M. Munyon

(57) ABSTRACT

Techniques are disclosed relating to a computer system identifying usage of a plurality of individual instances of a common computation task by a plurality of users of a networked service. These individual instances of the common computation task may generate a respective data set. Techniques also include creating, by the computer system, a global process to perform the common computation task. Execution of the global process may include generation of a global data set that includes at least portions of the respective data sets. Additionally, techniques include modifying, by the computer system, respective accounts of a subset of the plurality of users to use the global process in place of using a respective instance of the common computation task, as well as providing, by the computer system, the global data set generated by the global process to the respective accounts of the subset of users.

20 Claims, 8 Drawing Sheets

400

(56) References Cited

U.S. PATENT DOCUMENTS

| 2019/0188049 | A1* | 6/2019 | Choudhary | G06F 9/5016 |
|---|---|---|---|---|
| 2020/0241981 | A1 | 7/2020 | Ding et al. | |
| 2021/0203739 | A1 | 7/2021 | Calegari et al. | |
| 2022/0027170 | A1 | 1/2022 | Gulick, Jr. et al. | |
| 2022/0147406 | A1* | 5/2022 | Laurenzio | G06F 16/285 |

* cited by examiner

*System 100*
t0:
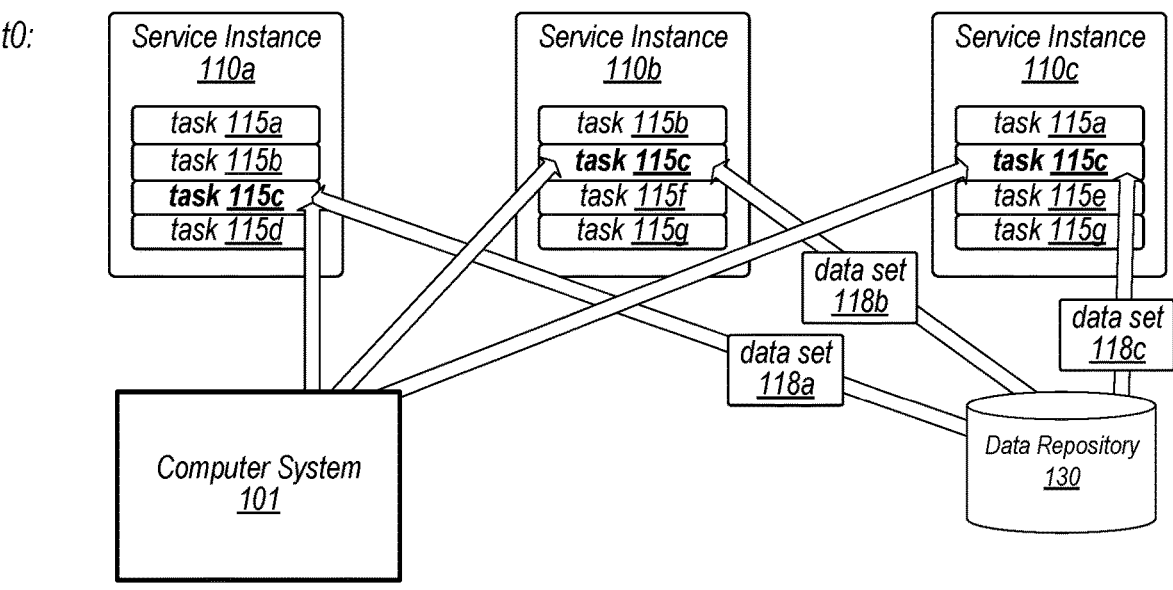
t1:
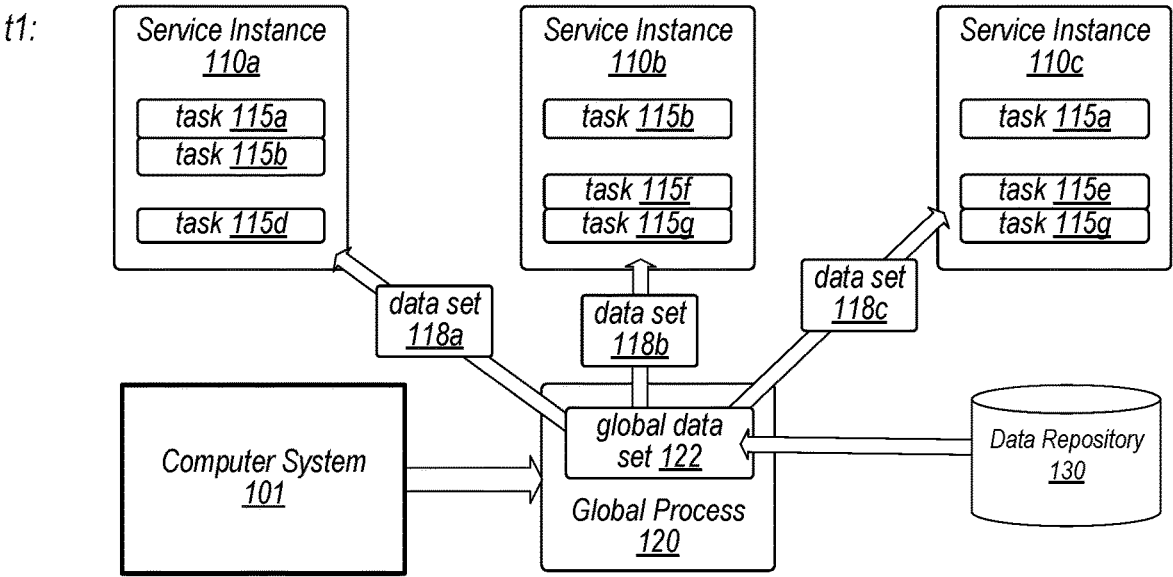
*FIG. 1*

System 100

*System 100*

```
                    Task 115c

FilterDataSet(filter1, filter2, ..., DataSet, FilteredData);
FindAverage(FilteredData,Avg);
FindMinimum(FilteredData,Min);
```

```
                    Task 115d

FilterDataSet(filter3, filter4, ..., DataSet, FilteredData);
FindAverage(FilteredData,Avg);
FindMaximum(FilteredData,Max);
```

```
                Global Process 120

FilterDataSet(filter1, filter2, ..., DataSet, FilteredData1);
FilterDataSet(filter3, filter4, ..., DataSet, FilteredData2);
FindAverage(FilteredData1,Avg1);
FindMinimum(FilteredData1,Min1);
FindAverage(FilteredData2,Avg2);
FindMaximum(FilteredData2,Max2);
```

```
                   GP API 225

GlobalProcess  (filter1, filter2, filter3, filter4, ..., DataSet,
                FilteredData1, FilteredData2);
```

Figure 4:
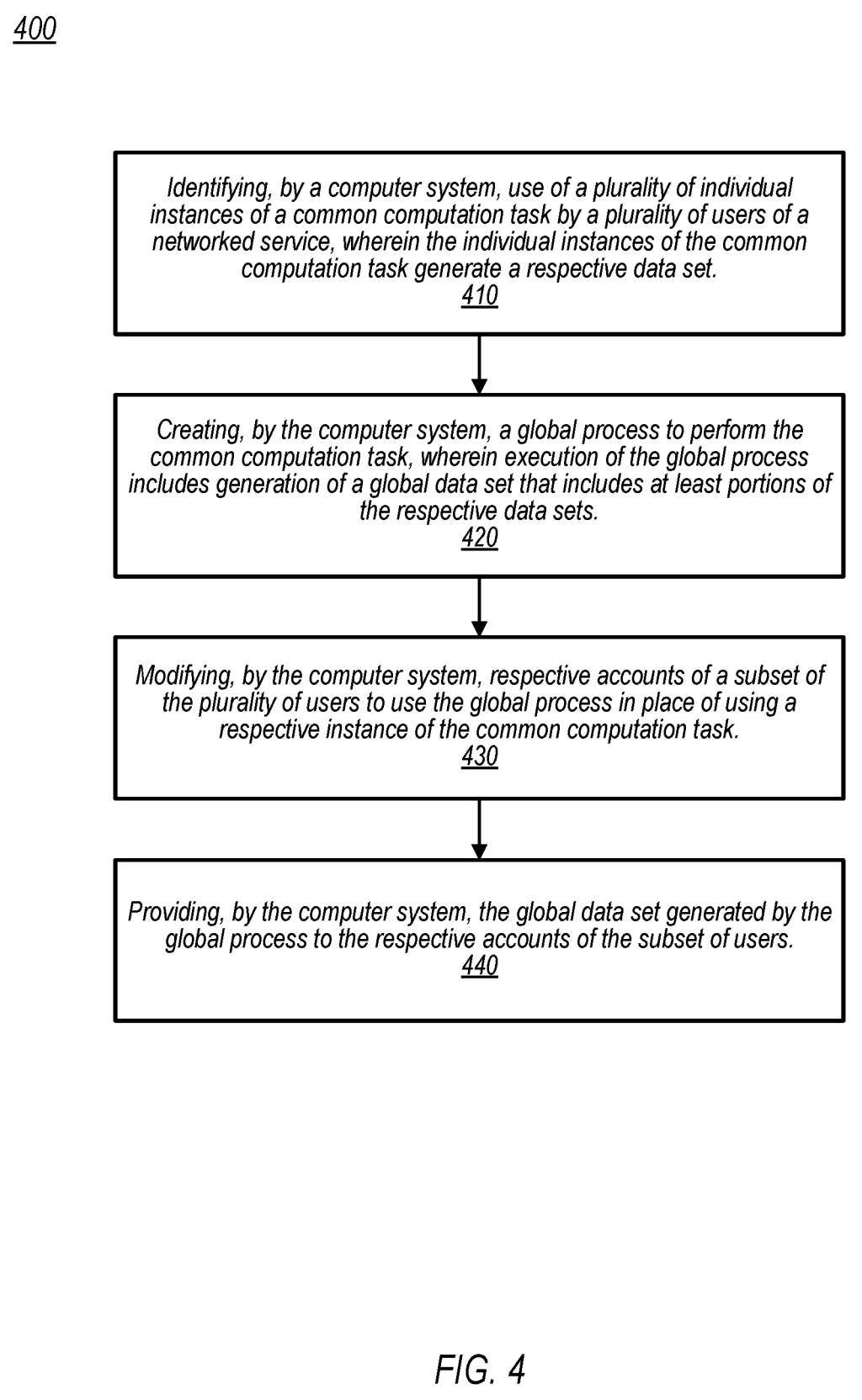

Identifying, by a computer system, use of a plurality of individual instances of a common computation task by a plurality of users of a networked service, wherein the individual instances of the common computation task generate a respective data set.
410

Creating, by the computer system, a global process to perform the common computation task, wherein execution of the global process includes generation of a global data set that includes at least portions of the respective data sets.
420

Modifying, by the computer system, respective accounts of a subset of the plurality of users to use the global process in place of using a respective instance of the common computation task.
430

Providing, by the computer system, the global data set generated by the global process to the respective accounts of the subset of users.
440

```
┌─────────────────────────────────────────────────────────────┐
│                                                               │
│   Modifying one of the respective accounts of the subset of   │
│   users while the corresponding user has an active instance   │
│   of the networked service, wherein the active instance of    │
│   the networked service was initiated prior to the creation   │
│   of the global process.                                      │
│                           510                                 │
│                                                               │
└─────────────────────────────────────────────────────────────┘
                               │
                               ▼
┌─────────────────────────────────────────────────────────────┐
│                                                               │
│   In response to the modifying of the one respective          │
│   account, terminating an individual instance of the common   │
│   computation task associated with the active instance of     │
│   the networked service.                                      │
│                           520                                 │
│                                                               │
└─────────────────────────────────────────────────────────────┘
```

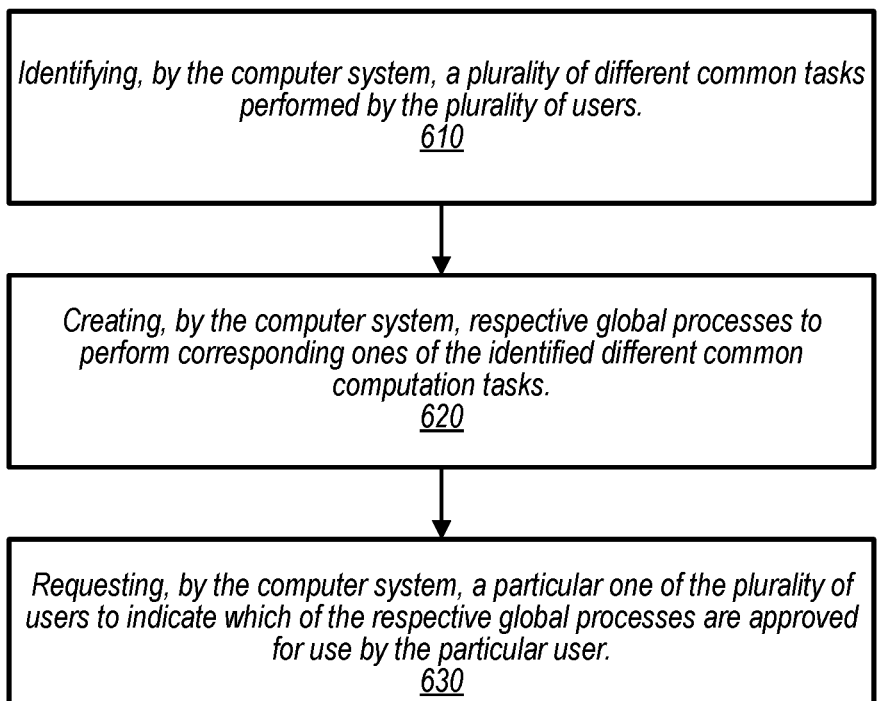

*Identifying, by the computer system, a plurality of different common tasks performed by the plurality of users.*
_610_

*Creating, by the computer system, respective global processes to perform corresponding ones of the identified different common computation tasks.*
_620_

*Requesting, by the computer system, a particular one of the plurality of users to indicate which of the respective global processes are approved for use by the particular user.*
_630_

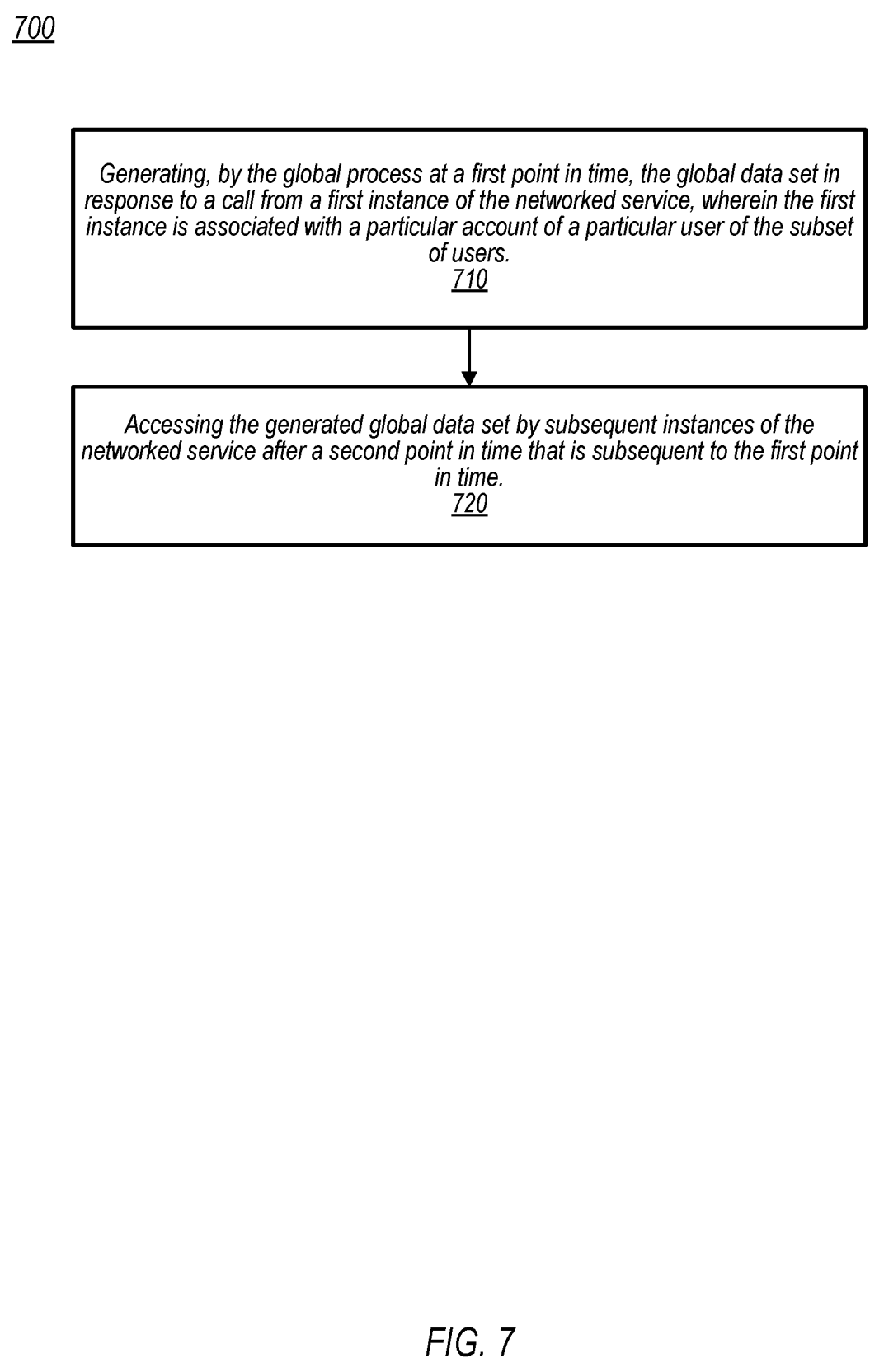

Generating, by the global process at a first point in time, the global data set in response to a call from a first instance of the networked service, wherein the first instance is associated with a particular account of a particular user of the subset of users.
_710_

Accessing the generated global data set by subsequent instances of the networked service after a second point in time that is subsequent to the first point in time.
_720_

FIG. 7

REDUCING PROCESSING BANDWIDTH OF NETWORKED SERVICES BY CONSOLIDATING SERVICE TASKS

BACKGROUND

Technical Field

Embodiments described herein are related to the field of networked services, and more particularly to techniques for reducing processing bandwidth for a networked service with a plurality of users.

Description of the Related Art

Data science models may be used in a wide variety of industries to analyze and summarize data that has been captured relative to a given industry. For example, data models may be used in healthcare to predict spread of a disease, or to prescribe a particular healthcare regimen to patients. Data models may be used to estimate risk of fraudulent activity by a user, or to predict socio-economic trends. Such data science models, however, require large amounts of data as input to improve accuracy. This input data may be captured from various sources, including, for example, various online activities, surveys, social media, electronic exchanges, and so forth. Accordingly, the input data may be located in a plurality of different data repositories. Networked services may be used to identify, gather, and pre-process data for use in data science models. A given networked service may include a plurality of microservices to perform particular tasks associated with the given networked service. Such microservices may consume large amounts of processor and memory bandwidth, thereby limiting performance and throughput of the models. Additionally, respective instances of the microservices may be deployed in a large number of computer systems to support tens, hundreds, thousands, or more users. As a result, many tasks associated with such microservices may be duplicated across all of these users' systems, thereby creating a duplication of effort and losses of processing bandwidth and memory storage capacity.

BRIEF DESCRIPTION OF THE DRAWINGS

The following detailed description makes reference to the accompanying drawings, which are now briefly described.

FIG. 1 illustrates block diagrams, at two different points in time, of an embodiment of a system that provides multiple instances of a networked service.

FIG. 3 depicts an example of generating a global process based on multiple instances of a common task.

FIG. 4 illustrates a flow diagram of an embodiment of a method for creating and using a global task to replace a common computation task.

FIG. 5 shows a flow diagram of an embodiment of a method for replacing a common computation task with a global task.

FIG. 6 depicts a flow diagram of an embodiment of a method for modifying a user account to use a global task in place of a common computation task.

FIG. 7 illustrates a flow diagram of an embodiment of a method for using a global task to generate a data set usable by a plurality of user accounts.

DETAILED DESCRIPTION OF EMBODIMENTS

Figure 2:
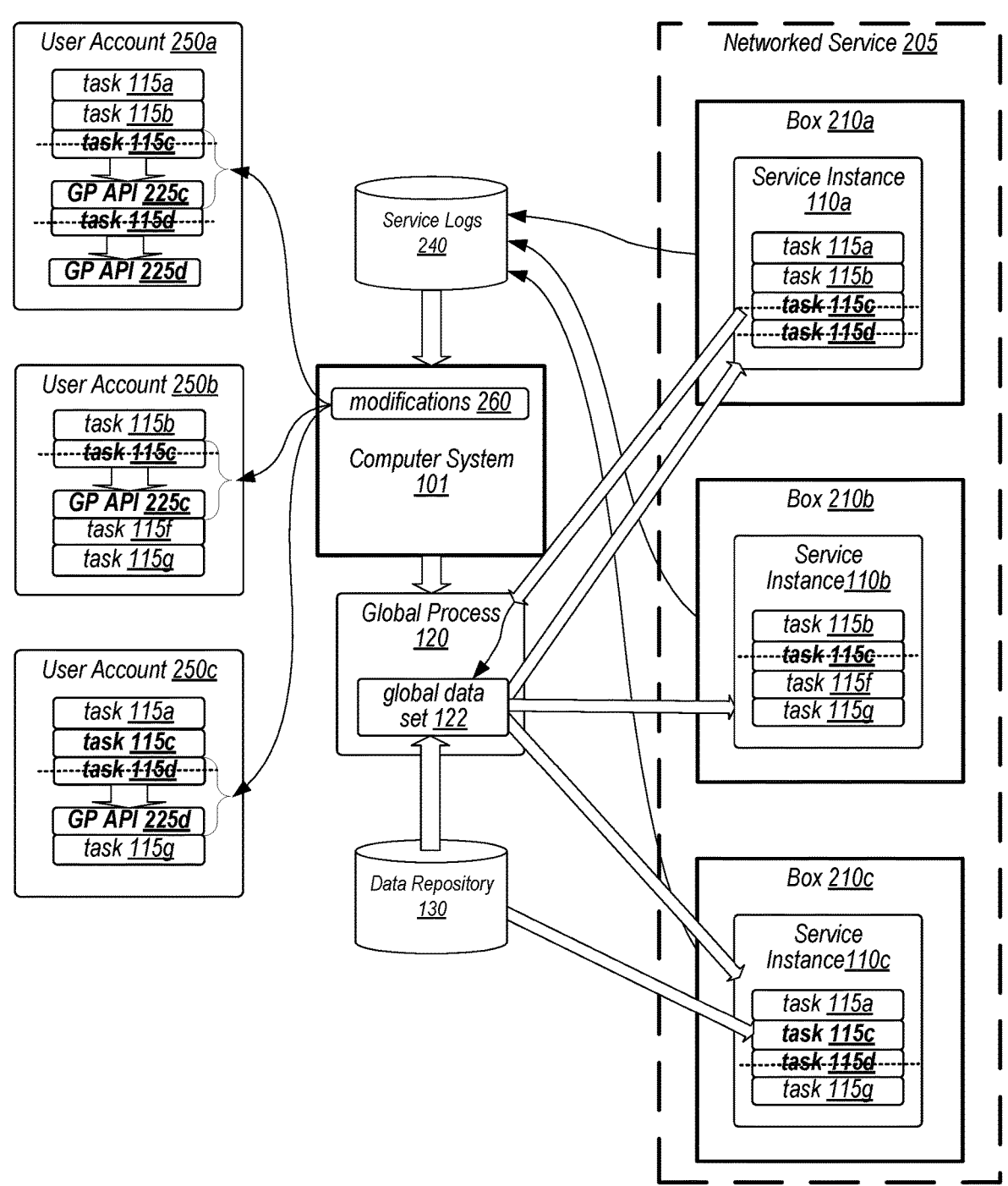
FIG. 2 shows a block diagram of an embodiment of a system that provides a networked service to a plurality of users.

As disclosed above, data science models may utilize a large quantity of data from raw data stored across a plurality of different data sources. In order to identify data to load for the given data science model, metadata for the stored data is generated during service startup for each instance of a networked service that provides access to the given data science model. During runtime of the instances, processing and loading of the stored data may occur based on user requests and the generated metadata. Generating the metadata and loading of the data may be CPU- and memory-heavy tasks which reduce the overall performance and throughput of the networked service, particularly if hundreds or thousands of instances of the networked service are deployed. Many of the above mentioned tasks are duplicated across many, or even all, of the instances, thereby causing a significant loss of computation bandwidth.

For example, a model-based risk decision service may be deployed in five hundred instances. During a startup sequence, each of these instances might take, on average, twelve minutes to complete. Multiple tasks may be performed during this time, including metadata generation (e.g., seven minutes), loading a set of static data (e.g., three minutes), and platform/system specific tasks (e.g., two minutes). If this service is performed for all 500 instances three times per week, every week, then the amount of processing bandwidth consumed may be 12 minutes per instance times 3 times a week times 500 instances, or 300 hours per week.

The loss of processing bandwidth may cause a number of issues. For example, service start times for new instances may take additional time which, in turn, may increase times for testing and releasing additional services. Metadata parsing may use additional memory during processing. Incoming requests may fail during a pre-processing window due to high processing and memory usage.

From the example above, replacing at least some of the microservice tasks with a global process that executes once for a plurality of the instances may significantly reduce the processing bandwidth. For example, if the metadata generation can be performed as a global task for 300 of the 500 instances, then the processing time may be reduced to 5 minutes per instance times 3 times a week for 300 instances plus 12 minutes per instance times 3 times a week for 200 instances, or 195 hours per week, saving 105 hours per week of processing bandwidth.

In some networked services, there may be many common tasks that are duplicated across the plurality of instances. An automated common task finder may monitor the application behavior over a period of time across boxes using application run logs, application build/compile related logs and feedback from the service owners to identify the set of tasks which are computation heavy, common across instances, and produce data sets that are consistent across instances. Such an automated common task finder may suggest tasks which can be executed outside of the running instances of the networked service.

Accordingly, the inventors have recognized that a technique is desired that may reduce the processing overhead associated with microservices by reducing a number of duplicate instances of a commonly performed service and/or microservice. Various techniques for reducing such duplication of effort across multiple instances of a particular computational task (e.g., a service or microservice) are disclosed below. These techniques may identify common (e.g., duplicate) processing-heavy computation tasks, and separate identified tasks as independent logical blocks with defined input and output. These independent blocks may be performed by an independent system and trigger the execution as needed to support the multiple instances of the microservice. This independent system may then make the output of the independent tasks available to the multiple instances via a fast access storage.

An embodiment of such a technique may include identifying, by a computer system, usage of a plurality of individual instances of a common computation task by a plurality of users of a networked service. These individual instances of the common computation task may generate respective data sets. The computer system creates a global process to perform the common computation task. Execution of this global process may include generation of a global data set that includes at least portions of the respective data sets. The computer system modifies respective accounts of a subset of the plurality of users, to cause the individual instances of the subset to use the global process in place of using a respective instance of the common computation task. The computer system then provides the global data set that is generated by the global process to the respective accounts of the subset of users. Use of the global process in place of the plurality of individual instances of the common computation task may reduce processing bandwidth as well as memory storage usage.

Use of such techniques may result in a variety of benefits such as an increased utilization of existing resources, and/or an increase in availability of the networked service. Other benefits may include improving throughput of the networked services as more processing bandwidth is available to serve user requests, as well as reducing a total cost of ownership. In general, an end-to-end performance improvement may be achieved.

A block diagram for an embodiment of a system that implements a networked service is illustrated in FIG. 1. As shown, system 100 includes computer system 101 and data repository 130. System 100, in various embodiments, may be implemented, for example, as a single computer system (e.g., computer system 101), a plurality of computer systems in a data center, as a plurality of computer systems in a plurality of data centers, and other such embodiments. In some embodiments, system 100 may be implemented as one or more virtual computer systems hosted by one or more server computer systems. System 100, as shown, implements a networked service that includes service instances 110a, 110b, and 110c (collectively 110). Each of service instances 110 includes respective ones of tasks 115a-115g (collectively 115).

Computer system 101 may include one or more processor circuits and a memory circuit that includes instructions that when executed by processor circuit, cause the system to perform operations described herein. As shown, system 100 may implement each of service instances 110 for a respective user. As each user utilizes their respective service instance 110, various ones of tasks 115 are performed. The various tasks 115 may perform any suitable operation or combination of operations to respond to queries and/or commands issued by the respective user. In some embodiments, each of service instances 110 may provide an interface for interacting with one or more data science models. Data science models may provide, via a respective service instance 110, data analysis associated with records stored in data repository 130.

Data repository 130 may store records for any suitable topic or topics. For example, records in data repository 130 may include various forms of weather information collected from around the world, and service instances 110 may provide a weather prediction model that allows a respective user to query the model to predict weather in a particular location or locations at various future points in time. In other embodiments, data repository 130 may include information related to user actions performed by users of one or more online services. In such embodiments, service instances 110 may provide a model for predicting likelihood of fraudulent activity based on the stored records. Data repository 130 may include thousands, millions, billions, or more records that are usable by service instances 110. In some embodiments, data repository 130 may include a plurality of data stores, co-located in a particular, or installed in various locations that are accessible to the service instances 110.

As illustrated at time t0, service instances 110 each include task 115c in common. Task 115c may generate a respective one of data sets 118a-118c for each of service instances 110. Task 115c may, e.g., generate metadata for respective records stored in data repository 130, the metadata based on respective requests received by each of service instances 110 by a respective user. A first user of service instance 110a may issue a query regarding a risk report for a particular entity. A second user of service instance 110b may issue a query regarding fraudulent activity in a particular city. A third user of service instance 110c may issue a query requesting a profile of fraudulent activity versus days of the week for a particular country. If the particular entity is located in the particular city, and the particular city is located in the particular country, then data sets 118a-118c produced by individual instances of task 115c may have considerable overlap. Performance of these individual instances of task 115c may duplicate considerable effort, thereby wasting computational bandwidth of system 100.

As another example, users of service instances 110a, 110b, and 110c may all want to know a total number of risk models that would be needed to evaluate a customer risk profile as a part of task 115c. Accordingly, data sets 118a, 118b, and 118c may provide raw data needing to be filtered to identify the risk models necessary to evaluate in task 115c for all of service instances 110.

In order to reduce the computational bandwidth consumed by the individual instances of task 115c, computer system 101 may be operable to identify usage of the plurality of individual instances of task 115c by the plurality of users of the networked service. Computer system 101 may then create global process 120 to perform task 115c. Global process 120 may be created such that executing global process 120 generates global data set 122, which may include at least portions of the respective data sets 118a-118c.

In some embodiments, after identifying common task 115c, computer system 101 may be operable to notify the plurality of users of service instances 110 that the plurality of individual instances of task 115c are in use. In such embodiments, users may be asked, by computer system 101, if they agree to use global process 120 in place of using a respective instance of task 115c. If a number of users agreeing satisfies a threshold, then computer system 101 may then be operable to generate global process 120.

As used herein, "satisfying a threshold" refers to a particular value meeting a particular constraint established by a threshold value. In various embodiments, the constraint may correspond to the particular value being, for example, greater than, greater than or equal to, less than, than or equal to, equal to, or not equal to. In some embodiments, two or more different threshold values may be used with a combination of constraints.

Computer system 101, as illustrated at time t1, may then modify respective accounts of a subset of the plurality of users to use global process 120 in place of using a respective instance of the common computation task 115*c*. Accounts of the users agreeing to use global process 120 may be modified to call global process 120 rather than implementing a respective instance of task 115*c*. At a first point in time, a call from a first instance of the networked service (e.g., service instance 110*a*) may cause global process 120 to generate global data set 122. Service instance 110*a* may be associated with a particular account of a particular user of the subset of users agreeing to use global process 120. Computer system 101 may then provide global data set 122 generated by global process 120 to the respective accounts of the subset of users. For example, after a second point in time that is subsequent to the first point in time, service instances 110*b* and/or 110*c* may access global data set 122.

Global data set 122 may be updated in response to one or more triggers. For example, global process 120 may be operable to execute if a particular amount of time has elapsed since the first point in time. In other embodiments, global process 120 may be operable to run after a threshold number of calls have been received from various ones of service instances 110. In some embodiments, a combination of triggers may be used. For example, global process 120 may execute in response to a call from one of service instances 110 after the particular amount of time has elapsed.

It is noted that system 100, as illustrated in FIG. 1, is merely an example. Elements in FIG. 1 have been simplified to highlight features relevant to this disclosure. In other embodiments, additional elements that are not shown may be included, and/or different numbers of the illustrated elements may be included. For example, one or more processors and/or memory circuits may be included in system 100 to perform and store computer instructions operable to perform global process 120 and/or the operations described herein. Although three service instances 110 are shown, any suitable number of service instances, including hundreds, thousands, or more, may be included.

In the description of FIG. 1 a networked service is disclosed as well as operations to modify user accounts. FIG. 2 depicts a different embodiment of system 100 that illustrates such operations in more detail.

Moving to FIG. 2, a block diagram for another embodiment of a system that implements a networked service is shown. As illustrated, system 100 includes computer system 101 and data repository 130 from FIG. 1. System 100 further includes networked service 205, service logs 240, and user accounts 250*a*-250*c* (collectively 250). Networked service 205 implements service instances 110 for respective user accounts 250 using boxes 210*a*-210*c* (collectively 210).

As shown, system 100 is operable to provide networked service 205 to a plurality of users via, for example, user accounts 250. An individual instance of the networked service, e.g., service instance 110*a*, is initiated for ones of the plurality of users, e.g., via user account 250*a*. For example, a particular user may, after logging into their associated user account 250*a*, submit a request for access to networked service 205. System 100, in response, generates service instance 110*a* using box 210*a*. In various embodiments, boxes 210 may be implemented, in whole or in part, using respective physical computer systems, a single computer system, virtual computer systems provided by one or more physical computer systems, and the like. In some embodiments, portions of service instance 110*a* may be divided between box 210*a* and a client computer system of the particular user. It is noted that each of service instances 110 are implemented as respective individual instances, potentially resulting in duplication of tasks if two or more of service instances 110 perform a same one of task 115.

Computer system 101, as illustrated, is operable to identify tasks 115*c* and 115*d* as common computation tasks performed by a plurality of service instances 110 of the networked service 205. Task 115*c* is performed by service instances 110*a*, 110*b*, and 110*c*. Task 115*d* is performed by service instances 110*a* and 110*c*. In some embodiments, tasks 115*a*, 115*b*, and 115*g* may also be identified as being performed by more than one of service instances 110. These tasks, however, may not be considered computationally heavy, or may produce unique data for respective ones of service instances 110 such that including one or more of tasks 115*a*, 115*b*, and 115*g* in a global process would not reduce processing bandwidth.

Determining that a plurality of instances of tasks 115*c* and 115*d* are used by a plurality of service instances 110 of networked service 205 includes monitoring, over a period of time, service logs 240 that are generated by service instances 110. For example, computer system 101 may monitor behavior of various instances of tasks 115 over a period of time, using service logs 240 that are generated by service instances 110 as users perform various requests and/or commands using their respective ones of service instances 110. Particular operations, e.g., accessing data repository 130, generating output to users, successful/unsuccessful login attempts, and the like may be logged by service instances 110 and then stored, e.g., in a database, as portions of service logs 240. Such logs may include particular information associated with performed operations. An operation to retrieve records from data repository 130 may, for example, include a list of particular records that were read as well as any records that were copied to a particular one of boxes 210. Computer system 101 may analyze service logs 240 to identify the tasks 115 that are used across multiple service instances 110 and determine which of tasks 115 are computationally heavy and/or produce common data sets.

As depicted, computer system 101 is operable to create global process 120 to replace individual instances of tasks 115*c* and 115*d*. Computer system 101 may generate a respective global process 120 to perform each one of tasks 115*c* and 115*d*. In other embodiments, computer system 101 may generate a single global process 120 that is capable of performing functions of both of tasks 115*c* and 115*d*. Use of global process 120 includes generation of global data set 122, which is usable by any of service instances 110 of users that have agreed to use global process 120. Global data set 122 may include some or all of data that is generated by respective instances of task 115*c* and/or 115*d*.

In some embodiments, computer system 101 may request users associated with user accounts 250*a*-250*c* to indicate whether they would agree to replacing their respective instances of task 115*c* and/or task 115*d* with a global process that is capable of providing the same or substantially similar functionality as tasks 115*c* and 115*d*. In such embodiments, computer system 101 may wait for a threshold number of user to agree before generating global process 120. In other cases, computer system 101 may generate global process 120 prior to, or concurrent with, requesting whether users agree to use of global process 120.

Computer system 101, as illustrated, is operable to modify, e.g., using modifications 260, respective user accounts 250 of a subset of the plurality of users to use global process 120 in place of using individual instances of task 115*c* and/or 115*d*. For example, in response to an indication of acceptance by a particular user associated with user account 250*b*, computer system 101 may modify service instance 110*b* of networked service 205 to call global process 120 in place of calling an individual instance of task 115*c* that was initiated for the particular user. Computer system 101 may further modify user account 250*b* of the particular user while service instance 110*b* is active. In such cases, service instance 110*b* may be initiated prior to the creating of global process 120. In response to the modifying of user account 250*b*, the instance of task 115*c* associated with active service instance 110*c* is terminated, thereby reducing processing overhead for box 210*b*.

To replace a given one of tasks 115, computer system 101 may be operable to generate an application interface for global process 120, e.g., GP API 225*c* and GP API 225*d*. Each of GP API 225*c* and GP API 225*d*, as depicted, correspond to task 115*c* and task 115*d*, respectively. A call to GP API 225*c* causes global process 120 to perform operations associated with task 115*c* and, likewise, a call to GP API 225*d* causes global process 120 to perform operations associated with task 115*d*. Accordingly, modifying user account 250*b* in the above example includes replacing a respective instance of task 115*c* with an instance of GP API 225*c*.

As shown, computer system 101 identifies a plurality of instances for both task 115*c* and 115*d* being performed by service instances 110. Computer system 101 may, therefore, request ones of the plurality of users that are using both tasks 115*c* and 115*d* to indicate which of the respective global processes are approved for use by the particular user. As seen in FIG. 2, a user of user account 250*a* agrees to use GP API 225*c* to replace task 115*c* as well as to use GP API 225*d* to replace task 115*d*. A user of user account 250*c*, however, agrees only to use GP API 225*d* to replace task 115*d*, and retains use of task 115*c*. Such flexibility may ease a user's concerns with using a global process in place of using an individual instance of a task, thereby potentially increasing a number of users willing to adopt use of global processes to reduce processing bandwidth.

After global process 120 has been generated and executed for a first time, global data set 122 is generated and access to the global data set is provided to respective accounts of the users agreeing to use of global process 120. As described above in regards to FIG. 1, a first access to global process 120 by any of service instances 110 may trigger global process 120 to generate global data set 122. In cases, such as shown, in which a single global process 120 is capable of replacing multiple tasks 115 (e.g., task 115*c* and 115*d*) a first call to GP API 225*c* may generate a portion of global data set 122, while a first call to GP API 225*d* may generate a second portion of global data set 122. Subsequent calls to either GP APIs 225*c* or 225*d* provide access to the respective generated portions.

It is noted that the embodiment of FIG. 2 is merely an example to demonstrate the disclosed concepts. Although three user accounts are shown, any suitable number of user accounts may be supported in other embodiments. As described, in other embodiments, a respective global process may be generated for each of tasks 115*c* and 115*d* rather than the single illustrated global process 120. Although tasks 115*c* and 115*d* are shown as being replaceable by global process 120, in other embodiments, one or more of tasks 115*a*, 115*b*, and 115*g* may also be replaceable.

The descriptions of FIGS. 1 and 2 disclose generation of a global process from an identified common computation task. Such a global process may be generated in a variety of manners. FIG. 3 shows one such example for generating a global process.

Turning to FIG. 3, an example is shown of a system generating a global process from two identified common computation tasks. System 100 includes examples of task 115*c*, task 115*d*, global process 120, and GP API 225 from FIGS. 1 and 2. The examples are illustrated using pseudo-code to demonstrate how global process 120 and GP API 225 may be created from the identified common tasks 115*c* and 115*d*.

As disclosed above, a computer system may be operable to identify common tasks performed by a plurality of instances of a networked service, and then use the identified tasks to create a global process that is performed in place of the plurality of instances of the common tasks. In FIG. 2, computer system 101 is described as identifying tasks 115*c* and 115*d* as being performed by a plurality of service instances 110. As shown in FIG. 3, generating global process 120 includes taking code from tasks 115*c* and 115*d* and including similar code in global process 120.

In the illustrated example, task 115*c* includes operations such as filtering a data set based on provided filter criteria to generate a filtered data set. This filtered data set may then be analyzed to determine an average value and a minimum value. In a similar manner, task 115*d* includes operations such as filtering the data set based on different filter criteria to generate a different filtered data set. This different filtered data is analyzed to determine an average value and a maximum value.

To generate global process 120, the code from each of tasks 115*c* and 115*d* is included in global process 120. As shown, a single performance of global process 120 may generate a data set that includes data that would be generated by respective performances of tasks 115*c* and 115*d*. To replace tasks 115*c* and 115*d* in a plurality of instances of a networked service, computer system 101 may generate an application interface for global process 120, e.g., GP API 225. GP API 225 is generated to call global process 120. As shown, GP API 225 is written such that a single performance of GP API 225 may cause global process 120 to generate all data in place of tasks 115*c* and 115*d*. In other embodiments, GP API 225 may be created in a manner that requires a first call to GP API 225 to generate data corresponding to task 115*c* and a different call to GP API 225 to generate data corresponding to task 115*d*.

As illustrated, modifying respective accounts of users (e.g., user accounts 250 in FIG. 2) includes replacing a respective instance of task 115*c* or task 115*d* with an instance of GP API 225. In response to the modifying ones of user accounts 250, computer system 101 may be operable to terminate an individual instance of task 115*c* and/or task 115*d* associated with an active service instance 110 of the networked service. Referring to FIG. 2, respective instances of task 115*c* and 115*d* may be terminated in service instance 110*a* after user account 250*a* has been modified to use GP API 225.

It is noted that FIG. 3 is only an example to demonstrate the disclosed concepts. Only elements needed to illustrate these concepts are shown. Pseudocode used in these examples demonstrates a simple example for clarity. Actual tasks performed by other embodiments of a networked service may include more complex operations that may require significant amounts of processor bandwidth.

FIGS. 1-3 describe various techniques identifying and replacing computation tasks used across a plurality of instances of a networked service. FIGS. 4-7 demonstrate four such methods.

Moving now to FIG. 4, a flow diagram for an embodiment of a method for training and operating a retrieval model as part of a semantic search is shown. Method 400 may be performed by a computer system such as computer system 101 in FIGS. 1-2. For example, computer system 101 may include (or have access to) a non-transient, computer-readable memory having program instructions stored thereon that are executable by computer system 101 to cause the operations described with reference to FIG. 4. Method 400 is described below using computer system 101 of FIG. 1 as an example. References to elements in FIG. 1 are included as non-limiting examples.

Method 400 begins at 410 with a computer system identifying usage of a plurality of individual instances of a common computation task by a plurality of users of a networked service. For example, computer system 101 may monitor activity associated with service instances 110 of FIG. 1. During this monitoring, an individual instance of task 115c may be observed to be performed by a respective one of service instances 110. Each instance of task 115c may, when performed, generate a respective one of data sets 118.

At 420, method 400 continues with the computer system creating a global process to perform the common computation task. As shown at time t1 in FIG. 1, computer system 101 may generate global process 120 to perform task 115c. Generation of global process 120 may include copying at least a portion of code from task 115c into global process 120. Once generated, executing global process 120 may generate global data set 122 that includes at least portions of the respective data sets 118.

Method 400 proceeds to 430 with the computer system modifying respective accounts of a subset of the plurality of users to use the global process in place of using a respective instance of the common computation task. A user account associated with a given one of service instances 110 may include indications of which tasks 115 are usable by a user associated with the user account. To enable a particular user to make use of global process 120 in place of task 115c, computer system 101 may modify the particular user's account to indicate that global process 120 is to be used rather than launching an individual instance of task 115c. After one or more user accounts have been modified to use global process 120, when a first service instance 110 associated with one of the modified user accounts calls global process 120, global process 120 may generate global data set 122.

At 440, method 400 further continues with the computer system providing the global data set generated by the global process to the respective accounts of the subset of users. After global data set 122 has been generated, computer system 101 may make global data set 122 accessible to other service instances 110 associated with the other modified user accounts.

It is noted that the method of FIG. 4 includes elements 410-440. Method 400 may end in 440 or may repeat some or all elements of the method. For example, method 400 may repeat, e.g., periodically and/or in response to launch of a new instance of the networked service in order to determine if currently active instances of the networked service are performing individual instances of other tasks that may be replaceable by a global process. In some cases, method 400 may be performed concurrently with other instances of the method. For example, multiple instances of method 400 may be performed concurrently to identify multiple instances of different sets of tasks. One instance of method 400 may look for multiple instances of tasks 115a though 115d while a different instance of method 400 looks for multiple instances of tasks 115e though 115g.

Proceeding now to FIG. 5, a flow diagram for an embodiment of a method for modifying a respective account of a user to use a global process in place of an individual instance is shown. Method 500 may be performed by a computer system such as computer system 101 in FIGS. 1 and 2. In some embodiments, method 500 may be performed as a part of method 400. For example, method 500 may be included as a part of operation 430. Method 500 is described below using computer system 101 of FIG. 2 as an example. References to elements in FIG. 2 are included as non-limiting examples.

Method 500 begins at 510 with a computer system modifying one of the respective accounts of the subset of users while the corresponding user has an active instance of the networked service. Method 400 may begin after operation of 420 of method 400 has been performed, thereby creating a global process (e.g., global process 120) for replacing one or more individual instances of tasks 115. Referring to FIG. 2, a particular user associated with user account 250b has a corresponding active service instance 110b of networked service 205 that was initiated prior to the creating of global process 120. Global process 120 is operable to replace individual instances of task 115c. In response to approval from the particular user, user account 250b is modified to call global process 120 (using GP API 225c) rather than use an individual instance of task 115c.

At 520, method 500 continues by, in response to the modifying of the one respective account, terminating an individual instance of the common computation task associated with the active instance of the networked service. For example, in response to modifying user account 250b to call global process 120 in place of task 115c, a currently active instance of task 115c may be terminated within service instance 110b. In some embodiments, task 115c may be allowed to complete or otherwise reach a stable state before being terminated in order to avoid leaving an orphaned sub-task active. For example, an active instance of task 115c may generate a request to data repository 130 for which there may be a delay before the request is fulfilled. Such a request may be allowed to complete rather than leaving an open request to data repository 130 due to terminating task 115c prior to the fulfilment of the request.

It is noted that the method of FIG. 5 includes elements 510 and 520. Method 500 may end in 520 or may repeat one or both elements of the method. For example, method 500 may repeat for each user account that has approved a replacement of a given task with a call to global process 120. In some cases, method 500 may be performed concurrently with other instances of the method to modify multiple user accounts in parallel.

Moving to FIG. 6, a flow diagram for an embodiment of a method for identifying and replacing a plurality of tasks performed by a plurality of instances of a networked service is shown. Method 600 may be performed by a computer system such as computer system 101 in FIGS. 1-2. In some embodiments, method 600 may be performed as a part of operations 410 and 420 of method 400. Method 600 is described below using elements of FIG. 2 as a non-limiting example.

Method 600 begins at 610 by identifying, by the computer system, a plurality of instances of a set of different common computation tasks performed by the plurality of users. For example, computer system 101 may determine that tasks 115*c* and 115*d* of network service 205 have multiple instances used across service instances 110, as shown in FIG. 2. Task 115*c* is used by all three of service instances 110, while task 115*d* is used by service instances 110*a* and 110*c*. Computer system 101 may make this determination by monitoring log records stored in service logs 240 by service instances 110.

At 620, method 600 continues by creating, by the computer system, respective global processes to perform corresponding ones of the set of different common computation tasks. In some embodiments, such as described above, computer system 101 may be operable to generate a single global process 120 capable of performing operations for both of tasks 115*c* and 115*d*. In other embodiments, computer system 101 may be operable to generate independent processes, e.g., global process 120*c* and global process 120*d* (not shown), to replace task 115*c* and task 115*d*, respectively.

Method 600 proceeds in 630 with requesting, by the computer system, a particular one of the plurality of users to indicate which of the respective global processes are approved for use by the particular user. For example, after global processes 120*c* and 120*d* are available, computer system 101 may notify users associated with service instances 110*a* and 110*c* that a global process is available for one or more of the tasks 115 that they are utilizing. The user of service instance 110*a* may agree to using both global processes 120*c* and 120*d*, while the user of service instance 110*c* may agree to using global process 120*d*, but not to using global process 120*c*. In some cases, a user may not agree to using any available global process to replace an individual instance of a task. As described above, computer system 101 may be operable to modify respective user accounts for the users of service instances 110*a* and 110*c* in order to replace the individual instances tasks 115*c* and/or 115*d* with the respective global processes. Such flexibility may encourage user agreement to replace individual instances of common computation tasks with available global processes, thereby increasing processing bandwidth that is available for other tasks.

It is noted that the method of FIG. 6 includes elements 610-630. Method 600 may end in 630 or may repeat some or all elements of the method. For example, method 600 may repeat operation 630 for each service instance that includes one or more of the identified common computation tasks. In some cases, method 600 may be performed concurrently with other methods disclosed herein. For example, one or more instances of method 600 may be performed while an instance of method 500 is performed to terminate an active task that is being replaced by a global process.

Turning to FIG. 7, a flow diagram for an embodiment of a method for generating and user a global data set is depicted. In a similar manner as described for methods 400-600, method 700 may be performed by a computer system, e.g., computer system 101 in FIGS. 1-2, to cause the operations described with reference to FIG. 7. Method 700 is described below using elements of computer system 101 of FIG. 1 as a non-limiting example.

Method 700 begins at 710 at a first point in time with the global process generating the global data set in response to a call from a first instance of the networked service, wherein the first instance is associated with a particular account of a particular user of the subset of users. For example, referring to FIG. 1 at time t1, global process 120 may be triggered in response to a call from service instance 110*b*. This triggering causes global process to generate global data set 122, from which data set 118*b* may be extracted and provided to service instance 110*b*.

At 720, method 700 proceeds after a second point in time, subsequent to the first point in time, with subsequent instances of the networked service accessing the generated global data set. Services instance 110*a* and 110*c*, for example, may make calls to global process 120 after global data set 122 has been generated. Rather than performing global process 120 two additional times, the already generated global data set 122 is used to provide data sets 118*a* and 118*c* to service instances 110*a* and 110*c*, respectively, thereby reducing an overall processing bandwidth needed to generate all three data sets 118 as compared to using respective instances of task 115*c* to generate each of data sets 118 independently.

It is noted that method 700 of FIG. 7 includes elements 710 and 720. Method 700 may end in 720. In some embodiments, one or both operations of method 700 may be included within method 400, such as within operation 440. Method 700 may repeat some or all elements of the method. For example, method 700 may repeat operation 720 for a plurality of subsequent calls to global process 120. In some embodiments, method 700 may be repeated after a particular amount of time and/or after a particular number of calls to global process 120.

Figure 8:
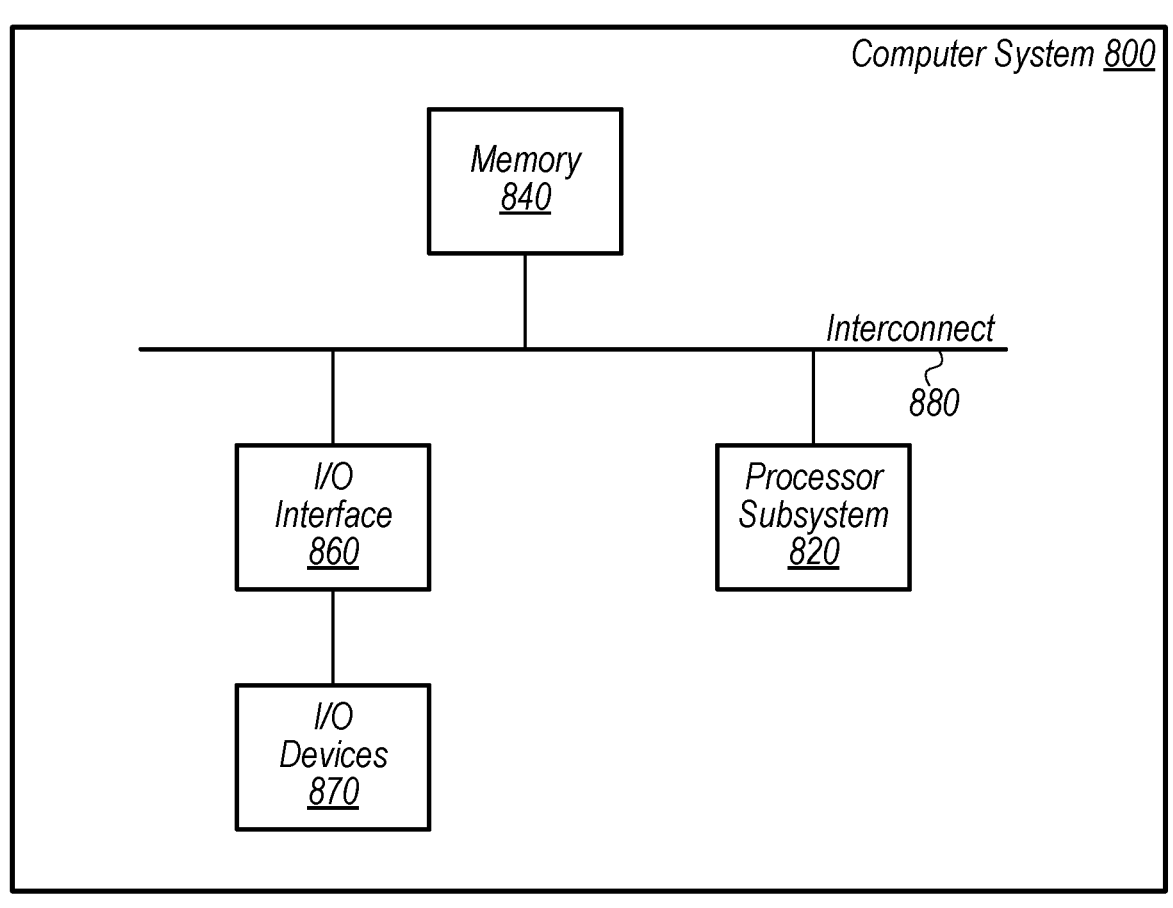
FIG. 8 shows a block diagram of an embodiment of a computer system that may be used to implement one or more embodiments of the disclosed system.

In the descriptions of FIGS. 1-7, various embodiments of a computer system for implementing the disclosed techniques have been disclosed, such as computer system 101 in FIGS. 1 and 2 and or as one or more computer systems for implementing system 100 in FIGS. 1-3. The computer system may be implemented in a variety of manners. FIG. 8 provides an example of a computer system that may correspond to one or more of the disclosed systems.

Referring now to FIG. 8, a block diagram of an example computer system 800 is depicted. Computer system 800 may, in various embodiments, implement one or more disclosed computer systems, such as computer system 101. Computer system 800 includes a processor subsystem 820 that is coupled to a system memory 840 and I/O interfaces(s) 860 via an interconnect 880 (e.g., a system bus). I/O interface(s) 860 is coupled to one or more I/O devices 870. Computer system 800 may be any of various types of devices, including, but not limited to, a server computer system, personal computer system, desktop computer, laptop or notebook computer, mainframe computer system, server computer system operating in a datacenter facility, tablet computer, handheld computer, smartphone, workstation, network computer, connected vehicle, etc. Although a single computer system 800 is shown in FIG. 8 for convenience, computer system 800 may also be implemented as two or more computer systems operating together, e.g., as a virtual computer system.

Processor subsystem 820 may include one or more processor circuits. In various embodiments of computer system 800, multiple instances of processor subsystem 820 may be coupled to interconnect 880. In various embodiments, processor subsystem 820 (or each processor unit within 820) may contain a cache or other form of on-board memory.

System memory 840 is usable to store program instructions executable by processor subsystem 820 to cause computer system 800 perform various operations described herein, including, for example, any of methods 400 to 700. System memory 840 may be implemented using any suitable type of memory circuits including, for example, different physical, non-transitory, computer-readable media, such as hard disk storage, floppy disk storage, removable disk storage, flash memory, random access memory (RAM-SRAM, EDO RAM, SDRAM, DDR SDRAM, LPDDR SDRAM, etc.), read-only memory (PROM, EEPROM, etc.), and so on. Memory circuits in computer system 800 are not limited to primary storage such as system memory 840. Rather, computer system 800 may also include other forms of storage such as cache memory in processor subsystem 820 and secondary storage in I/O devices 870 (e.g., a hard drive, storage array, etc.). In some embodiments, these other forms of storage may also store program instructions executable by processor subsystem 820.

I/O interfaces 860 may be any of various types of interfaces configured to couple to and communicate with other devices, according to various embodiments. In one embodiment, I/O interface 860 is a bridge chip (e.g., Southbridge) from a front-side to one or more back-side buses. I/O interfaces 860 may be coupled to one or more I/O devices 870 via one or more corresponding buses or other interfaces. Examples of I/O devices 870 include storage devices (hard drive, optical drive, removable flash drive, storage array, SAN, or their associated controller), network interface devices (e.g., to a local or wide-area network), or other devices (e.g., graphics, user interface devices, etc.). In some embodiments, I/O devices 870 includes a network interface device (e.g., configured to communicate over Wi-Fi®, Bluetooth®, Ethernet, etc.), and computer system 800 is coupled to a network via the network interface device.

The various techniques described herein may be performed by one or more computer programs. The term "program" is to be construed broadly to cover a sequence of instructions in a programming language that a computing device can execute. These programs may be written in any suitable computer language, including lower-level languages such as assembly and higher-level languages such as Python. The program may be written in a compiled language such as C or C++, or an interpreted language such as JavaScript.

Program instructions may be stored on a "computer-readable storage medium" or a "computer-readable medium" in order to facilitate execution of the program instructions by a computer system. Generally speaking, these phrases include any tangible or non-transitory storage or memory medium. The terms "tangible" and "non-transitory" are intended to exclude propagating electromagnetic signals, but not to otherwise limit the type of storage medium. Accordingly, the phrases "computer-readable storage medium" or a "computer-readable medium" are intended to cover types of storage devices that do not necessarily store information permanently (e.g., random access memory (RAM)). The term "non-transitory," accordingly, is a limitation on the nature of the medium itself (i.e., the medium cannot be a signal) as opposed to a limitation on data storage persistency of the medium (e.g., RAM vs. ROM).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

Note that in some cases, program instructions may be stored on a storage medium but not enabled to execute in a particular computing environment. For example, a particular computing environment (e.g., a first computer system) may have a parameter set that disables program instructions that are nonetheless resident on a storage medium of the first computer system. The recitation that these stored program instructions are "capable" of being executed is intended to account for and cover this possibility. Stated another way, program instructions stored on a computer-readable medium can be said to "executable" to perform certain functionality, whether or not current software configuration parameters permit such execution. Executability means that when and if the instructions are executed, they perform the functionality in question.

The present disclosure refers to various operations that are performed in the context of instructions executed by one or more computer systems. For example, methods 400-700 are described as, in some embodiments, being performed by computer system 101 as shown in various ones of FIGS. 1-2. In addition, various processes (e.g., global process 120 FIGS. 1-3) are described as being performed by a computer system such as computer system 101). Computer system 101 may include one or more computer systems included, for example, in one or more data centers (physical facilities that store data that drives enterprise computing applications and provides online services to users via, e.g., the Internet). These components, therefore, are implemented on physical structures (i.e., on computer hardware).

In general, any of the services or functionalities of a software development environment described in this disclosure can be performed by a host computing device, which is any computer system that is capable of connecting to a computer network. A given host computing device can be configured according to any known configuration of computer hardware. A typical hardware configuration includes a processor subsystem, memory, and one or more I/O devices coupled via an interconnect. A given host computing device may also be implemented as two or more computer systems operating together.

The processor subsystem of the host computing device may include one or more processor circuits or processing units. In some embodiments of the host computing device, multiple instances of a processor subsystem may be coupled to the system interconnect. The processor subsystem (or each processor unit within a processor subsystem) may contain any of various processor features known in the art, such as a cache, hardware accelerator, etc.

The system memory of the host computing device is usable to store program instructions executable by the processor subsystem to cause the host computing device to perform various operations described herein. The system memory may be implemented using different physical, non-transitory memory media, such as hard disk storage, floppy disk storage, removable disk storage, flash memory, random access memory (RAM SRAM, EDO RAM, SDRAM, DDR SDRAM, RAMBUS RAM, etc.), read-only memory (PROM, EEPROM, etc.), and so on. Memory in the host computing device is not limited to primary storage. Rather, the host computing device may also include other forms of storage such as cache memory in the processor subsystem and secondary storage in the I/O devices (e.g., a hard drive, storage array, etc.). In some embodiments, these other forms of storage may also store program instructions executable by the processor subsystem.

The interconnect of the host computing device may connect the processor subsystem and memory with various I/O devices. One possible I/O interface is a bridge chip (e.g., Southbridge) from a front-side to one or more back-side buses. Examples of I/O devices include storage devices (hard drive, optical drive, removable flash drive, storage array, SAN, or their associated controller), network interface devices (e.g., to a computer network), or other devices (e.g., graphics, user interface devices).

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation-[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

In this disclosure, various "modules" and "models" operable to perform designated functions are shown in the figures and described in detail (e.g., global process 120). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC. Accordingly, a module that is described as being "executable" to perform operations refers to a software module, while a module that is described as being "configured" to perform operations refers to a hardware module. A module that is described as "operable" to perform operations refers to a software module, a hardware module, or some combination thereof. Further, for any discussion herein that refers to a module that is "executable" to perform certain operations, it is to be understood that those operations may be implemented, in other embodiments, by a hardware module "configured" to perform the operations, and vice versa.

What is claimed is:

1. A method comprising:
identifying, by a computer system, usage of a plurality of individual instances of a common computation task by a plurality of users of a networked service, wherein the individual instances of the common computation task generate respective data sets;
creating, by the computer system, a global process to perform the common computation task, wherein execution of the global process includes generation of a global data set that includes at least portions of the respective data sets;
modifying, by the computer system, respective accounts of a subset of the plurality of users to use the global process in place of using a respective instance of the common computation task; and
providing, by the computer system, the global data set generated by the global process to the respective accounts of the subset of users.

2. The method of claim 1, wherein the modifying of the respective accounts of the subset of users includes modifying the respective accounts in response to an indication of an approval from corresponding users in the subset.

3. The method of claim 1, further comprising modifying one of the respective accounts of the subset of users while a user of the one respective account has an active instance of the networked service, wherein the active instance of the networked service was initiated prior to the creating of the global process.

4. The method of claim 3, further comprising:

in response to the modifying of the one respective account, terminating an individual instance of the common computation task associated with the active instance of the networked service.

5. The method of claim 1, wherein creating the global process includes adding at least a portion of code from the common computation task to the global process.

6. The method of claim 1, wherein identifying the usage of the plurality of individual instances of the common computation task includes monitoring behavior of the plurality of individual instances over a period of time using service logs generated by respective instances of the networked service.

7. The method of claim 1, further comprising:

identifying, by the computer system, a plurality of instances of a set of different common computation tasks performed by the plurality of users;

creating, by the computer system, respective global processes to perform corresponding ones of the set of different common computation tasks; and requesting, by the computer system, a particular one of the plurality of users to indicate which of the respective global processes are approved for use by the particular user.

8. The method of claim 1, further comprising generating, by the global process at a first point in time, the global data set in response to a call from a first instance of the networked service, wherein the first instance is associated with a particular account of a particular user of the subset of users.

9. The method of claim 8, further comprising accessing the generated global data set by subsequent instances of the networked service after a second point in time that is subsequent to the first point in time.

10. A non-transitory, computer-readable memory including instructions that when executed by a computer system, cause the computer system to perform operations including:

providing a networked service to a plurality of users, wherein an individual instance of the networked service is provided to respective ones of the plurality of users;

determining that a plurality of individual instances of a common computation task are used by a plurality of individual instances of the networked service;

generating a global process to perform the common computation task, wherein use of the global process includes generation of a global data set;

modifying respective accounts of a subset of the plurality of users to use the global process in place of using an individual instance of the common computation task; and providing access to the global data set to respective accounts of the subset of users.

11. The non-transitory, computer-readable medium of claim 10, further comprising:

in response to the determining, notifying the plurality of users that the plurality of individual instances of the common computation task are in use; and generating the global process in response to an indication that a threshold number of the plurality of users agree to using the global process in place of using a respective individual instance of the common computation task.

12. The non-transitory, computer-readable medium of claim 11, wherein the modifying includes modifying the respective accounts for the users that agreed to using the global process.

13. The non-transitory, computer-readable medium of claim 10, wherein generating the global process includes generating an application interface for the global process; and wherein modifying the respective accounts of the subset of users includes replacing a respective instance of the common computation task with an instance of the application interface for the global process.

14. The non-transitory, computer-readable medium of claim 10, further comprising:

performing the global process in response to one or more of the respective accounts of the subset of users launching an instance of the networked service; and in response to performing the global process, updating the global data set.

15. The non-transitory, computer-readable medium of claim 10, wherein the determining that the plurality of individual instances of the common computation task are used by the plurality of individual instances of the networked service includes monitoring, over a period of time, service logs generated by the plurality of individual instances of the networked service.

16. A system comprising:

a non-transitory memory storing instructions;

a processor configured to execute the instructions to cause the system to perform operations comprising:

providing a networked service to a plurality of users, wherein an individual instance of the networked service is initiated for ones of the plurality of users;

identifying a common computation task performed by a plurality of individual instances of the networked service;

creating a global process to replace individual instances of the common computation task; and in response to an indication of acceptance by a particular user, modifying a particular instance of the networked service to call the global process in place of calling an individual instance of the common computation task, wherein the particular instance was initiated for the particular user.

17. The system of claim 16, wherein the operations further comprise in response to the identifying, notifying the plurality of users of the common computation task that is performed by the plurality of individual instances; and creating the global process in response to an indication that a threshold number of the plurality of users agree to using the global process in place of using a respective individual instance of the common computation task.

18. The system of claim 16, wherein generating the global process includes generating an application interface for the global process; and wherein modifying the particular instance of the networked service includes replacing a respective instance of the common computation task with an instance of the application interface for the global process.

19. The system of claim 16, wherein the operations further comprise:

generating a global data set by performing the global process in response to launching the particular instance of the networked service; and in response to performing the global process, updating the global data set.

20. The system of claim 16, wherein the operations further comprise; wherein identifying the common computation task includes monitoring service logs generated by the plurality of individual instances of the networked service over a period of time.

\* \* \* \* \*